No. 616,418. Patented Dec. 20, 1898.
N. C. HENNING.
PROCESS OF AND APPARATUS FOR GENERATING OIL GAS.
(Application filed Mar. 24, 1898.)
(No Model.)
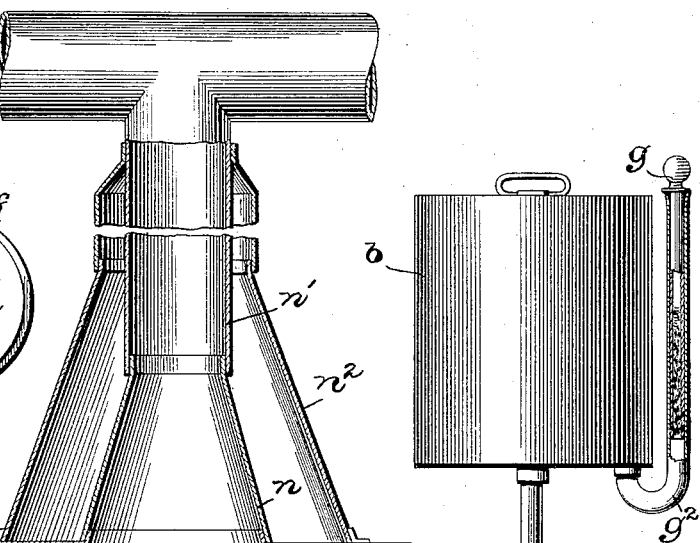
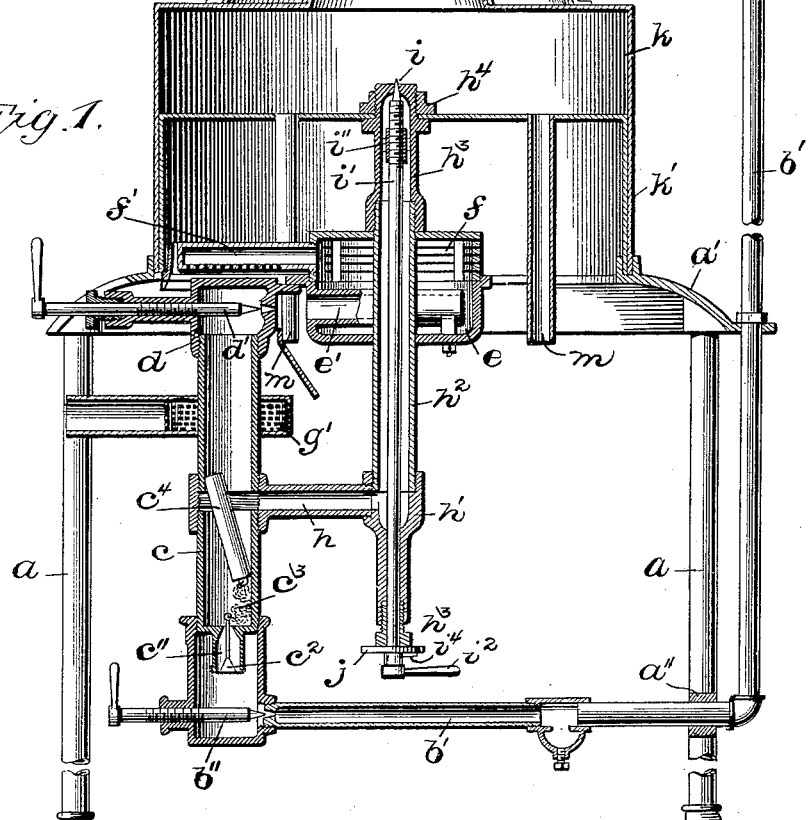
Witnesses
Jos. C. Stack.
F. Davis.
Inventor
Norval C. Henning
By John C. Lowell
His Attorney
THE NORRIS PETERS CO., PHOTO-LITHO., WASHINGTON, D. C.

UNITED STATES PATENT OFFICE.

NORVAL C. HENNING, OF NEW VIENNA, OHIO, ASSIGNOR OF ONE-THIRD TO MOSES RICE, OF SAME PLACE.

PROCESS OF AND APPARATUS FOR GENERATING OIL-GAS.

SPECIFICATION forming part of Letters Patent No. 616,418, dated December 20, 1898.

Application filed March 24, 1898. Serial No. 675,015. (No model.)

*To all whom it may concern:*

Be it known that I, NORVAL C. HENNING, a citizen of the United States, residing at New Vienna, in the county of Clinton and State of Ohio, have invented certain new and useful Improvements in Methods of and Apparatus for Generating Oil-Gas; and I do hereby declare the following to be a full, clear, and exact description of the invention, such as will enable others skilled in the art to which it appertains to make and use the same.

This invention relates to methods of and apparatus for generating illuminating-gas from hydrocarbon liquid, such as gasolene, and has in view the production of a domestic oil-gas-generating plant in which the elements of safety, economy, and efficiency are pronounced and which involves no complicated construction likely to get out of order or difficult to manipulate. An apparatus constructed in accordance with the invention can be managed with ease by an unskilled person, and even if a mistake is made nothing serious in the way of an accident can occur.

I am aware that long prior to my present invention there are instances in the art to which it pertains of oil-gas-generating plants in which a portion of a gas-conduit constitutes a retort subjected to the flame of a burner fed from said conduit; but I am not aware that any apparatus of this character has been practically successful in generating illuminating-gas, and in evolving the present invention I have sought to overcome certain defects in prior apparatus which have come to my notice.

The general idea above expressed is present in my invention and is an essential part of it; but other elements are introduced which clothe this fundamental idea in practical form and make the present invention an advance in the art.

With the above-stated objects in view the invention consists in certain novel methods of procedure and combinations of parts, the essential elements of which are recited in the appended claims and a detailed description of a preferred form of embodiment of which is given hereinafter with reference to the accompanying drawings, whereof—

Figure 1 represents the complete apparatus for the most part in vertical section with some portions in elevation and some broken away. Fig. 2 represents the burner in top plan view with the gas-conduit extending therethrough in cross-section, and Fig. 3 represents an indicator in bottom plan.

The supporting-framework of the apparatus may be of any suitable design, that here shown comprising legs $a$ and a top $a'$, at some distance above which a supply-tank $b$ is supported, said tank being adapted to contain gasolene or other hydrocarbonaceous liquid and having an outlet-pipe $b'$ depending from its lower side and supported by a flange on the frame-top $a'$ and a cross-piece $a''$ extending between two of the frame-legs $a$. The burner employed is not of itself new with me, but is substantially like that shown in Patent No. 567,479, dated September 8, 1896, and comprises a retort in the form of a stand-pipe $c$, screwing at its lower end into a casing which has a screw-threaded boss on one side receiving the gasolene-supply pipe $b'$, the latter having a tapered seat for a needle-valve $b''$, entered through a screw-threaded boss in the opposite side of said casing and having a suitable handle on the exterior of the latter. Said stand-pipe has a valve-chamber $c''$ depending within said casing and having a screen across its lower end and a tapered seat in its upper side for a conical valve $c^2$, whose stem is connected by a chain $c^3$ with a float $c^4$ in the retort. When the apparatus is not in use, the float closes the said valve to stop the flow of the gasolene; but when the apparatus is in operation the pressure of vapor in the retort lowers the gasolene, so that the said valve may open. A head $d$ on the upper end of the stand-pipe has a tapered opening in one side controlled by a needle-valve $d'$, entered through the opposite side, and immediately opposite said opening is a mixing-chamber $e$, having an interior pipe $e'$ open at both ends and adapted to take in vapor and air at one end and discharge the same from its opposite end into the said mixing-chamber. Above the latter is a burner-cap $f$, having a branch $f'$ extending over the retort-head $d$, so as to direct a flame downward thereagainst. The operation of this burner will be apparent and is substantially the same as that described in said patent above mentioned, the initial heat being applied to the retort $c$ by means of an asbestos torch $g$, which is introduced into a perforated annular chamber $g'$ embracing the retort and suitably supported thereon. This torch may be charged with gasolene in a tube $g^2$, communicating with the bottom of the tank $b$ and extending upwardly alongside the same.

In carrying out my invention I connect with the stand-pipe $c$ a short horizontal pipe $h$, which communicates with the interior of the latter and is united to a fitting $h'$, supporting the lower end of a supplemental stand-pipe or retort $h^2$, whose upper portion extends through the burner close to one side of the same, as shown in Fig. 2, so as to be fully exposed to the flame. This pipe $h^2$ protrudes from the top of the burner, and a nozzle $h^3$ is screwed onto it and down against the burner-cap, and said nozzle has a tapered hole in its upper end controlled by a needle-valve $i$, whose stem $i'$ is screw-threaded for engagement with a boss $i''$ in the nozzle, the said stem thence extending downwardly through the pipe $h^2$ and through the fitting $h'$, which has a stuffing-box $h^3$. An index-plate $j$ is fastened to the gland of the latter, and the handle $i^2$ of the valve-stem carries an index-finger $i^4$, extending over said plate, the object of this arrangement being to determine the extent of opening of the needle-valve controlling the gas-supply.

Immediately over the burner there is an oven or hot-air chamber $k$, supported upon the frame-top $a'$ by means of a flange or skirt $k'$, the bottom of said oven fitting around the nozzle $h^3$ and against a shoulder thereof and being clamped upon the latter by a nut $h^4$ engaging a screw-threaded end portion of the nozzle. Air-pipes $m$ depend from the bottom of the oven to a point below the cap of the burner, and fresh air is drawn in through these pipes to supply the oven into which the nozzle $h^3$ discharges the vapor superheated in the pipe $h^2$. A funnel-shaped hood $n$ fits around a central opening in the top of the oven and connects with a pipe $n'$, through which gas is conveyed to the illuminating-burners. This pipe and the hood are preferably surrounded by a jacket $n^2$ to prevent undue radiation of heat.

The operation of the generator will be apparent and requires but brief explanation. Vapor passing from the stand-pipe or retort $c$ through the pipe $h$ and into the supplemental stand-pipe or retort $h^2$ is subjected in the latter to the heat of the main burner, and the gas evolved passes into the oven and is there mixed with a copious supply of hot air. The result is an illuminating-gas of high quality, which gives a flame of great brilliancy without smoke. It will be understood that the oil-level is never above the pipe $h$, and, in fact, when the apparatus is in operation the oil-level is lowered considerably below that permitted by the float by reason of the pressure of the vapor.

It will be seen that the construction and arrangement of parts above described provides for perfect control and regulation of the generator and also insures against accident.

Of course the construction here illustrated is susceptible of modification within the scope of the invention, and therefore in the claims which follow the essential elements of the latter are recited without limitation to specific structure.

Having thus fully described my invention, what I claim as new, and desire to secure by Letters Patent of the United States, is—

1. In an oil-gas generator, the combination of a vaporizing chamber or retort having an oil-supply connection, a burner communicating with and supplied directly from said chamber and extending in proximity thereto for the purpose of heating the same to generate vapor therein, a superheating chamber or retort communicating with the first-mentioned chamber or retort and associated with the burner so as to be subjected to the heat of the same, and an air-chamber adjacent to the burner receiving the discharging end of said superheating-retort.

2. In an oil-gas generator, the combination of a vaporizing chamber or retort having an oil-supply connection, a burner communicating with and supplied directly from said chamber and extending in proximity thereto for the purpose of heating the same to generate vapor therein, a superheating chamber or retort communicating with the first-mentioned chamber or retort and extending through the burner near one side of the same, and an air-chamber adjacent to the latter and receiving the discharging end of the superheating-retort.

3. In an oil-gas generator, the combination of a stand-pipe having an oil-supply connection at its lower part and constituting a retort at its upper part, valves at the upper and lower ends of said stand-pipe controlling outflow of vapor and inflow of oil respectively, a burner alongside the retort portion of said stand-pipe and communicating therewith and having a branch extending over the top thereof, an air-heating chamber or oven arranged over the burner and having one or more air-inlet pipes depending below the burner, a supplemental stand-pipe extending through the main portion of the burner and communicating through a suitable connection at its lower end with the first-mentioned stand-pipe, and opening at its upper end into the air-heating chamber, and a valve controlling outlet of gas from said supplemental stand-pipe into the air-heating chamber.

4. The improved method of generating illuminating-gas, the same consisting in vaporizing hydrocarbon liquid, burning part of the vapor without superheating and applying resultant heat for further vaporization of the liquid, superheating part of the vapor, and mixing heated air with the superheated vapor to produce illuminating-gas.

5. The improved method of generating illuminating-gas, the same consisting in vaporizing hydrocarbon liquid, burning part of the vapor without superheating and applying resultant heat for further vaporization of the liquid, superheating part of the vapor, by such resultant heat, heating air by such resultant heat, and mixing such heated air with the superheated vapor to produce gas of high illuminating power.

In testimony whereof I affix my signature in presence of two witnesses.

NORVAL C. HENNING.

Witnesses:
   JOHN BODEN,
   J. W. PENN.